United States Patent
Mitterreiter

[19]
[11] Patent Number: 5,984,564
[45] Date of Patent: *Nov. 16, 1999

[54] ADAPTER FOR COUPLING TWO SHAFT ENDS IN A DEFINED ANGULAR ORIENTATION

[75] Inventor: Johann Mitterreiter, Chieming, Germany

[73] Assignee: Dr. Johannes Heidenhain GmbH, Traunreut, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/895,228

[22] Filed: Jul. 16, 1997

[30] Foreign Application Priority Data

Jul. 20, 1996 [DE] Germany ............... 296 12 584

[51] Int. Cl.⁶ .................................................. F16B 7/04
[52] U.S. Cl. ...................... 403/305; 403/375; 403/14; 250/231.13
[58] Field of Search ................... 403/375, 300, 403/305, 301, 4, 405.1, 345, 13, 14; 464/88, 87, 901; 250/231.13, 231.14, 231.15, 231.16, 231.17, 231.18

[56] References Cited

U.S. PATENT DOCUMENTS

| | | | |
|---|---|---|---|
| 349,678 | 9/1886 | Applegate | 403/300 |
| 590,695 | 9/1897 | Alcorn | 403/305 X |
| 1,238,994 | 9/1917 | Erickson | 403/305 X |
| 2,348,071 | 5/1944 | Johnstone | 403/305 |
| 3,080,185 | 3/1963 | Walker | 403/300 |
| 3,423,957 | 1/1969 | Palmer | 403/305 X |
| 3,542,178 | 11/1970 | Ripple | 464/901 X |
| 3,704,602 | 12/1972 | Einhorn | 464/88 X |
| 4,718,879 | 1/1988 | Wada | 403/4 X |
| 4,752,683 | 6/1988 | McGuire | 250/231.14 |
| 4,846,760 | 7/1989 | Betterton et al. | 403/300 X |
| 5,407,294 | 4/1995 | Giannini | 403/405.1 X |
| 5,501,542 | 3/1996 | Hall, Sr. | 403/306 |
| 5,708,496 | 1/1998 | Barnett et al. | 250/231.13 X |

FOREIGN PATENT DOCUMENTS

| | | |
|---|---|---|
| 2 593 864 | 8/1987 | France . |
| 2 633 349 | 12/1989 | France . |
| 91 13 604 U | 4/1992 | Germany . |
| 43 40 064 C1 | 1/1995 | Germany . |

OTHER PUBLICATIONS

Ernst, A., Digitale Längen–und Winkelme Sstechnik, [Digital Longitudinal and Angular Metrology], Verlag Modern e Industrie, 3rd ed., p. 40 (1989).

*Primary Examiner*—Harry C. Kim
*Attorney, Agent, or Firm*—Brinks Hofer Gilson & Lione

[57] ABSTRACT

An adapter for the coupling of two shaft ends in a defined angular orientation with respect to the longitudinal shaft axes. The adapter is mounted in a defined angular orientation on a first shaft, and on the side associated with a second shaft it has a receptacle for receiving the second shaft. The second shaft has an end that is partially flattened The receptacle is surrounded by a flange in one partial segment of which is at least one projection having inclined surfaces of such dimensions, that the projection fits interlockingly into the flattened part of the second shaft upon reaching the desired angular orientation of the two shafts. The adapter according to the invention is particularly suited for the connection of the shaft of a drive unit with the shaft of an rotary encoder.

14 Claims, 2 Drawing Sheets

ADAPTER FOR COUPLING TWO SHAFT ENDS IN A DEFINED ANGULAR ORIENTATION

FIELD OF THE INVENTION

The invention relates to an adapter for coupling two shaft ends in a defined angular orientation with respect to the longitudinal axes of the shafts. The adapter according to the invention is particularly suited for connecting the shafts of a drive unit and a rotary encoder.

BACKGROUND OF THE INVENTION

Several possibilities for connecting the shaft of a drive unit with the shaft of an rotary encoder are known. For example, the connection can be established with the aid of suitable couplings, perhaps such as those described on page 41 of "Digital Longitudinal and Angular Metrology" by A. Ernst, Verlag Moderne Industrie, publs., 3rd ed., 1989. With extreme measuring demands, correspondingly high demands are also made regarding the torsional rigidity on such couplings. An alternative for avoiding the problems arising in this connection lies in the use of a so-called stator coupling where the actual coupling is not disposed on the rotor side but rather is disposed between the drive housing and the scanning unit of the rotary encoder, i.e. on the stator side. Such a coupling is known, for example, from FIG. 24 on page 43 of the above mentioned book.

In the case of stator coupling of the drive and rotary encoder shafts, the driveshaft is rigidly connected with the rotary encoder shaft by the aid of a center screw which is arranged coaxially with respect to both shafts. However, problems arise under certain conditions with this type of rotary encoder mounting. For example, the place where the two shafts meet each other may not directly accessible. If at the same time a defined angular orientation between the two shafts is demanded, for example, because of the defined association of a reference pulse of the rotary encoder to the driveshaft, an elaborate adjusting process of the two systems with respect to each other is the result. There is furthermore the danger that, following the performance of an adjustment of the two shafts with respect to each other, the two shafts are again twisted with respect to each other in an undesirable way because of the tightening of the central screw.

SUMMARY OF THE INVENTION

According to a first aspect of the invention there is provided an adapter for coupling a first and a second shaft end in a defined angular orientation with respect to the longitudinal axes of the shafts. The second shaft end is partially flattened. The adapter includes one end for receiving in a defined angular orientation, the first shaft end and a receptacle for receiving the second shaft end. A flange surrounds the receptacle and has a partial segment which has at least one projection having inclined surfaces of such dimensions that the projection interlockingly fits into the flattened area of the second shaft end when the desired angular orientation has been achieved.

It is therefore an object of the present invention to create an adapter which offers a simple defined angular alignment of two shafts if, for example, the shaft ends are not directly accessible. In this case the actual coupling function between the two shafts is not provided by the adapter; instead, a rigid coupling of the two shafts with each other is provided in which the angular orientation, once it has been established, is intended to be maintained.

The adapter according to the invention permits simple mounting of an rotary encoder on a drive unit where simultaneously a defined angular orientation of the two shafts to each other is assured. If, for example, the disposition of a rotary encoder in a cylinder-shaped receptacle of a drive unit is provided, the rotary encoder can be inserted into the receptacle roughly aligned once the adapter has been mounted on the rotary encoder shaft. The adapter according to a preferred embodiment of the invention allows the two shafts to align themselves exactly in the desired angular orientation with respect to each other without the shaft ends having to be visible or accessible. In the course of the subsequent tightening of the central screw for the rigid coupling of the two shafts with each other, it is furthermore assured that the two aligned shafts can no longer become twisted with respect to each other.

The adapter according to the invention is advantageously embodied as an inexpensively manufactured injection-molded part since no special mechanical demands are made on the adapter in the actual measuring operation.

Further advantages as well as details of the adapter according to the invention ensue from the following description of preferred embodiments through the attached drawings.

DETAILED DESCRIPTION OF THE PRESENTLY PREFERRED EMBODIMENTS

Figure 1:
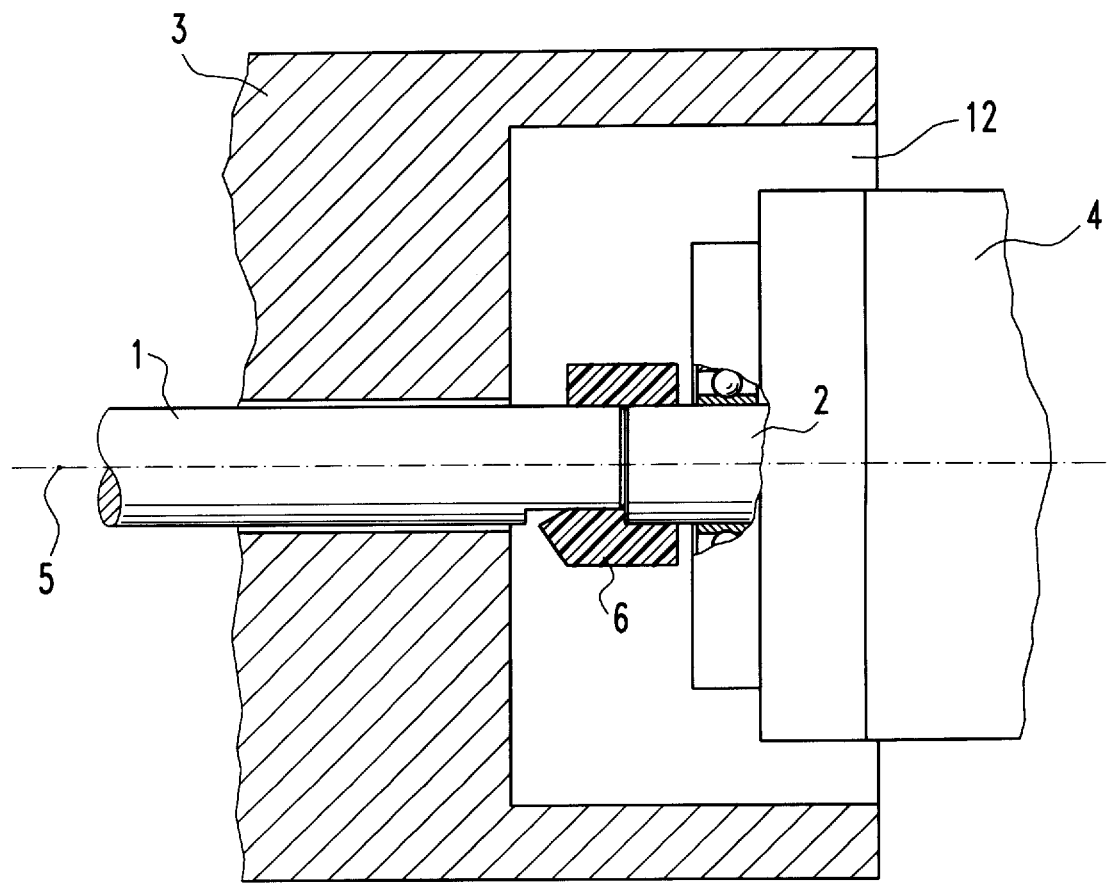
FIG. 1 is a cross-sectional view of two shaft ends of a drive and of a rotary encoder to be connected through the adapter according to a preferred embodiment of the invention.

FIG. 1 is a cross-sectional view of two shafts 1, 2 to be connected of a drive unit 3 and of a rotary encoder 4 respectively through an adapter 6 according to a preferred embodiment of the present invention. Both the drive unit 3 and the rotary encoder 4 are only partially shown. In the coupled state the two shaft ends are not directly accessible because of the arrangement of the rotary encoder 4 in the cylinder-shaped receptacle 12, and can therefore not be angularly adjusted.

A central screw (not shown) is provided coaxially with the two shafts 1, 2, and rigidly connects the two shafts 1, 2 with each other. To this end the central screw is tightened from the side of the rotary encoder 4. The actual coupling between the drive unit 3 and the rotary encoder 4 is also not visible in FIG. 1. A so-called stator coupling is provided as the coupling which is fastened on the stator side toward the rotary encoder 4, i.e. on the rotary encoder, and on the side toward the drive unit 3 on the housing of the latter.

In order to solve the problems referred to above, the adapter 6 according to the invention is disposed between the two shafts. In a preferred embodiment it is designed as a simple, rotationally symmetrical injection-molded element preferably made of fiberglass-reinforced polycarbonate, which has respectively one receptacle for the shaft ends of the drive and the rotary encoder shafts on two oppositely located sides. The connections between the two shaft ends and the adapter 6 can be embodied in different ways, for example, as releasable connections in the form of plug connections. Besides this, a connection between the adapter 6 and the rotary encoder shaft can be provided in such a way that the adapter 6 is pressed on the rotary encoder shaft 2, for example. Furthermore, the connection between the adapter 6 and the rotary encoder shaft 2 is embodied in such a way that a clear angular orientation of the adapter 6 with respect to the longitudinal axis 5 of this shaft 2 results, i.e. that no twisting with respect to it is possible. This can be assured, for example, in that the end of the rotary encoder shaft 2 is embodied to be flattened and that the receptacle on the side of the adapter 6 has a corresponding cross section, so that an interlocking connection results.

A circumferential flange is provided on the side of the adapter 6 which is associated with the driveshaft 1. The flange has, at least in a partial segment, a flattened projection oriented in the direction toward the driveshaft 1 with conical surfaces oriented toward each other. The flattening of the conical surfaces or the dimension of the projection is of such a size that for a desired angular orientation of the two shafts 1, 2 with respect to each other the projection fits interlockingly into a corresponding, oppositely located cutout in the driveshaft 1 as seen in FIG. 1. For example, in the preferred embodiment as shown in FIG. 1, the required cutout in the driveshaft 1 is embodied as a flattening of the shaft end into which the projection fits.

If, accordingly, the two shafts 1, 2 are roughly aligned with respect to each other during the mounting of the drive unit 3 and the rotary encoder 4, and if the projection on the adapter 6 arranged on the rotary encoder shaft 2 already partially engages the cutout in the driveshaft 1, the desired defined angular orientation of the two shafts 1, 2 results when they are pushed together. Because of the design of the projection with the two conically oriented surfaces, the shaft which turns easier of the two shafts 1, 2 is given a rotating movement until the projection fits interlockingly into the oppositely located cutout, i.e., the desired angular orientation is assured. The rigid fixation of the two shafts 1, 2 follows thereafter by tightening the central screw (not shown). Here, too, the embodiment of the adapter 6 in accordance with the invention proves to be advantageous, since twisting of the two shafts 1, 2 with respect to each other cannot occur when the screw is tightened as long as the projection has been interlockingly fitted into the cutout of shaft 1.

Figure 2:
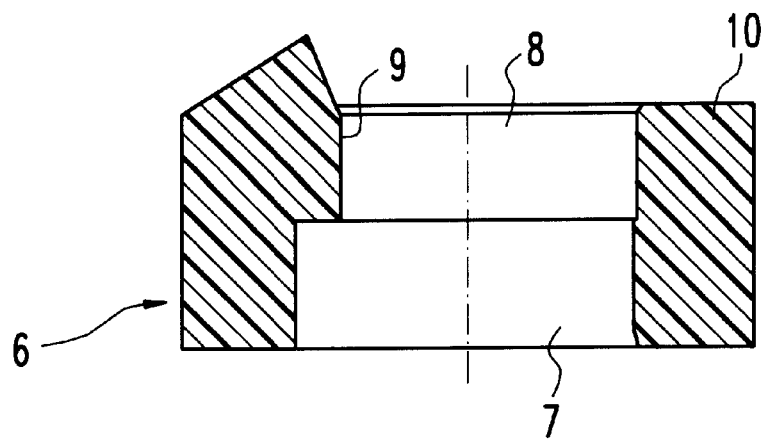
FIG. 2 is a cross-sectional view of the adapter shown in FIG. 1.

FIG. 2 is a cross-sectional view of the adapter shown in FIG. 1. The two receptacles 7, 8 of the adapter 6 for the shaft ends to be connected can be seen there, as well as the circumferential flange 10 on which the projection 9 is disposed in a partial segment.

Figure 3:
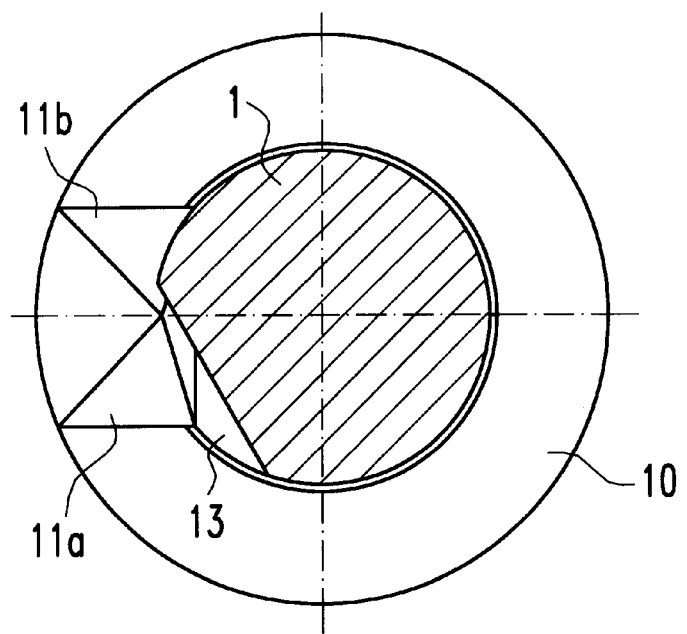
FIG. 3 is a cross-sectional view of the adapter shown in FIG. 2, taken in a plane perpendicular to the cross-section shown in FIG. 2.

FIG. 3 is a cross-sectional view of the adapter shown in FIG. 2 taken in a plane perpendicular to the cross-section shown in FIG. 2. The projection provided on the adapter 6 and its cooperation with the opposite cutout 13 in the driveshaft 1 become visible. In the representation of FIG. 3, the driveshaft 1 does not yet have the desired angular orientation with relation to the adapter 6, and instead was only roughly oriented with respect to it. However, the obliquely disposed surfaces 11a, 11b of the projection already partially engage the cutout 13 in the form of a flattening on the part of the shaft 1. In the course of pushing the shaft 1 and the adapter 6 or of the rotary encoder connected therewith further together, the adapter 6 and the driveshaft 1 turn toward each other because of the design of the projection until the projection fits interlockingly into the cutout 13 and the desired angular orientation is made. The design of the cutout 13 on the side of the shaft 1 in the form of a flattening of the shaft end is also clearly visible in this representation.

Alternatives to the described embodiment and to the arrangement of the adapter in accordance with the invention are of course also possible. For example, in principle the adapter can be connected with the driveshaft and the orientation of the two shafts takes place by the projection engaging a corresponding cutout in the rotary encoder shaft. In addition alternative embodiments regarding the design of the projection are possible, including the correspondingly dimensioned cutout on the side of the shaft arranged on the opposite side.

It is to be understood that the forms of the invention as described herewith are to be taken as preferred examples and that various changes or modifications in the shape, size and arrangement of parts may be resorted to without departing from the spirit of the invention or scope of the claims.

What is claimed is:

1. An adapter for coupling a first shaft end of a first shaft and a second shaft end of a second shaft in exactly one defined angular orientation with respect to the longitudinal axes of the first shaft and the second shaft, wherein the second shaft is partially flattened to form a cutout recess, the adapter comprising:

a first receptacle located at a first end of the adapter for receiving the first shaft end;

a second receptacle located at a second end of the adapter for receiving the second shaft end: and a flange encircling the second receptacle wherein a projection is located on the flange, the projection comprising a plurality of inclined surfaces with geometrical dimensions chosen so that both the first shaft and the second shaft turn toward each other in the course of pushing the first shaft and the second shaft together if the inclined surfaces already partially engages the cutout recess in the second shaft until the projection interlockingly fits into the cutout recess of the second shaft end when the desired angular orientation has been achieved.

2. The adapter according to claim 1, wherein the adapter is formed as an injection-molded element.

3. The adapter according to claim 2, wherein the adapter is made of fiberglass-reinforced polycarbonate.

4. The adapter according to claim 1, wherein the adapter is adapted to be releasably fastened on the first shaft in a defined angular orientation with respect to the longitudinal axis of the first shaft.

5. The adapter according to claim 1, wherein the projection comprises a plurality of conically extending surfaces.

6. A drive unit and rotary encoder system comprising a drive unit with a rotary encoder having a first shaft with a first shaft end and a second shaft with a second shaft end coupled with an adapter in a defined angular orientation with respect to the longitudinal axes of the first shaft and the second shaft, wherein the second shaft end is partially flattened to form a cutout recess, the adapter comprising:

a flange encircling a first end of the adapter wherein the flange encircles a receptacle for receiving the second shaft end wherein a projection is located on the flange, the projection having a plurality of inclined surfaces with geometrical dimensions chosen so that both the first shaft and the second shaft turn toward each other in the course of pushing the first shaft and the second shaft together if the inclined surfaces already partially engage the cutout recess in the second shaft until the projection interlockingly fits into the cutout recess of the second shaft end when the desired angular orientation has been achieved.

7. The drive unit and rotary encoder system according to claim 6 wherein the adapter is disposed on the second shaft of the rotary encoder for connection with the first shaft of the drive unit.

8. The drive unit and rotary encoder system according to claim 6 wherein the inclined surfaces of the projection are inclined in a way so that the projection interlockingly fits into the cutout recess of the second shaft when the desired orientation has been achieved.

9. The drive unit and rotary encoder system according to claim 6 wherein the projection has a chosen height so that the projection interlockingly fits into the cutout recess of the second shaft end when the desired orientation has been achieved.

10. The drive unit and rotary encoder system according to claim 6, wherein the first shaft end and the second shaft end are coupled with the adapter in exactly one defined angular orientation with respect to the longitudinal axes of the first shaft and the second shaft.

11. A drive unit and rotary encoder system comprising a drive unit with a rotary encoder having a first shaft with a first shaft end and a second shaft with a second shaft end coupled with an adapter in exactly one defined angular orientation with respect to the longitudinal axes of the first shaft and the second shaft, wherein the second shaft end is partially flattened to form a cutout recess, the adapter comprising:

a first receptacle located at a first end of the adapter and receiving the first shaft end;

a second receptacle located at a second end of the adapter and receiving the second shaft end; and a flange encircling the second receptacle wherein a projection is located on the flange, the projection having a plurality of inclined surfaces with geometrical dimensions chosen so that both the first shaft and the second shaft turn toward each other in the course of pushing the first shaft and the second shaft together if the inclined surfaces already partially engage the cutout recess in the second shaft until the projection interlockingly fits into the cutout recess of the second shaft end when the desired angular orientation has been achieved.

12. The drive unit and rotary encoder system according to claim 11, wherein the adapter is disposed on the second shaft of the rotary encoder for connection with the first shaft of the drive.

13. The drive unit and rotary encoder system according to claim 11 wherein the surfaces of the projection are inclined in a way so that the projection interlockingly fits into the cutout recess of the second shaft when the desired orientation has been achieved.

14. The drive unit and rotary encoder system according to claim 11 wherein the projection has a chosen height so that the projection interlockingly fits into the cutout recess of the second shaft end when the desired orientation has been achieved.

* * * * *

UNITED STATES PATENT AND TRADEMARK OFFICE
CERTIFICATE OF CORRECTION

PATENT NO. :     5,984,564
DATED       :     November 16, 1999
INVENTOR(S) :    Johann Mitterreiter It is certified that error appears in the above-identified patent and that said Letters Patent is hereby corrected as shown below:

On the Title Page

In column 2, line 6, under "ABSTRACT", delete "flattened The" and substitute --flattened. The-- in its place.

In column 2, line 13, under "ABSTRACT", delete "an rotary" and substitute --a rotary-- in its place.

In claim 1, line 10, delete "end:" and substitute --end;-- in its place.

In claim 1, line 17, delete "engages" and substitute --engage-- in its place.

Signed and Sealed this

Twenty-second Day of May, 2001

*Attest:*

NICHOLAS P. GODICI

*Attesting Officer*    *Acting Director of the United States Patent and Trademark Office*